Dec. 30, 1969   J. W. COOK   3,487,283

LARGE DRIVE POSITIONING CONTROL

Filed Aug. 3, 1966

WITNESSES:
Bernard R. Gieguer
James F. Young

INVENTOR
John W. Cook.
BY E. F. Possessky
ATTORNEY

United States Patent Office 3,487,283
Patented Dec. 30, 1969

3,487,283
LARGE DRIVE POSITIONING CONTROL
John W. Cook, Williamsville, N.Y., assignor to Westinghouse Electric Corporation, Pittsburgh, Pa., a corporation of Pennsylvania
Filed Aug. 3, 1966, Ser. No. 569,997
Int. Cl. H02p 1/04
U.S. Cl. 318—443                                          7 Claims

ABSTRACT OF THE DISCLOSURE

Large industrial direct current motor is controlled to position its output spindle with an accuracy of better than ±1°. The motor control includes a position detector and a pulse generator which applies pulses to the motor armature until the spindle reaches the specified position.

BACKGROUND OF THE INVENTION

The present invention relates to large industrial type motor drive systems and more particularly to industrial type motor drive systems in which there is a need for accurately controlling the angular position of a shaft output from the drive.

Metal rolling mills represent a substantial industrial application of large drive systems in which a need exists for positioning control. In a typical steel tandem rolling mill, each stand is provided with one or more large DC drive motors which are mechanically coupled to the mill drive rolls, often through a gearing and pinion arrangement. After a period of mill operation, such as eight hours in a hot rolling mill or as little as four hours in a cold rolling mill, the rolls become worn and must be replaced by new or reground rolls. The coupling between the drive system and the rolls at each stand location is usually made by means of a spline arrangement or the like between each output drive spindle and its associated roll. After removal of the worn rolls, roll replacement accordingly initially requires angular alignment of each spindle and its associated replacement roll followed by roll transfer into coupling engagement. With growing use of automatic equipment for roll changing, the need for accurate automatic control of drive spindle position is increasing since quick roll changes require accurate spindle positioning for acceptance of automatically oriented rolls from the automatic roll change equipment.

One manner in which spindle positioning can be achieved is by use of an auxiliary small motor drive system which is coupled to the drive spindle for positioning operation after mill shutdown. For example, positioning can be produced by a small AC or DC motor which operates through large reduction gearing and an eddy current or disconnect clutch. However, from the standpoint of overall system economy and efficiency, it is desirable that the main mill drive provide the spindle positioning function during the mill shutdown time. To meet the demands of commercial application, a main drive positioning control should be accurately operable, typically with a specified tolerance of ±1° in the controlled angular position of the drive spindle.

SUMMARY OF THE INVENTION

In accordance with the broad principles of the present invention, a positioning control for an industrial type speed controlled drive system having one or more large motors comprises a motor positioning energization control system and an output position sensing arrangement which cooperate to produce accurate and efficient main drive positioning. Preferably, a pulse generator control provides pulsed motor energization during the positioning mode of operation. If desired, a creep reference circuit provides for minimum adequate motor startup movement. The position sensing arrangement preferably includes a slowdown indicating device which initiates operation of the pulse generator control and a stop indicating device which causes pulse generator deactuation and main drive stoppage.

It is therefore an object of the invention to provide a novel positioning control for large industrial type drive systems in which highly accurate positioning is achieved economically and efficiently.

Another object of the invention is to provide a novel positioning control for large industrial type drive systems in which the large drive itself is controlled as a positioner.

An additional object of the invention is to provide a novel positioning control for large industrial type drive systems in which the large drive itself is operated to provide highly accurate positioning.

A further object of the invention is to provide a novel positioning control for large industrial type drive systems in which the large drive is operated by means of very low average energization to achieve accurate positioning under feedback control.

It is another object of the invention to provide a novel positioning control for large industrial type drive systems in which the large drive is operated by means of successive low energy pulses which are adequate to overcome friction and the like while being appropriately characterized to allow the drive to be stopped accurately under feedback control at a predetermined position.

These and other objects of the invention will become more apparent upon consideration of the following detailed description along with the attached drawings.

DESCRIPTION OF THE PREFERRED EMBODIMENT

Figure 1:
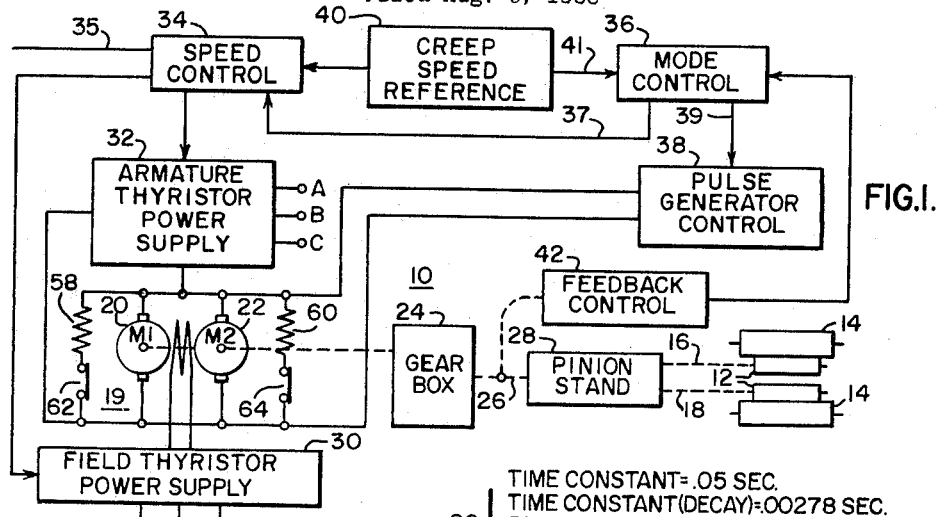
FIG. 1 shows a schematic diagram of a large industrial type drive system arranged to operate in a metal rolling mill and provided with position control operation in accordance with the principles of the invention.

More specifically, there is shown in FIG. 1 a large industrial type drive system 10 employed in this instance to operate a pair of work rolls 12 in a steel or other metal strip rolling mill. The work rolls 12 and backup rolls 14 are supported for strip gauge reduction operation at a single stand (not shown). The overall mill can comprise up to seven or more drive systems and stands with associated rolls through which the strip is sequentially transported for gauge reduction in accordance with a mill operating program.

By the terms of the present invention, the mill drive system 10 is also operable to control the position of respective spindles or shafts 16 and 18 which are interengaged with the work rolls 12. Typically, the interengagement would be formed by a spline coupling (not specifically shown) between each spindle 16 or 18 and the associated work roll 12.

The work rolls 12 have a size and construction suitable for rolling mill usage, but as previously indicated, are subject to wear and must be replaced periodically.

For this and other reasons, it is desirable from time to time to provide for accurate positioning of the output spindles 16 and 18. With the use of automatic roll changing equipment to remove old work rolls and to insert new work rolls it is particularly desirable that the position of the output spindles 16 and 18 be accurately and quickly controllable for indexed acceptance of the new rolls. Typically, it would be required that the angular position of the spindles 16 and 18 be controllable within a tolerance range of ±1° or less so that roll insertion can be conducted smoothly. In other applications of the invention, one or more similar output spindles or shafts can be position controlled for purposes similar to those just described or for other purposes dependent upon the application.

One or more conventional DC drive motors are employed in the system 10 to drive the output spindles 16 and 18. In this instance, a single motor 19 is employed, and it is provided with a double armature as indicated by the reference characters 20 and 22. The drive motor 19 typically would have a rating of up to 9000 horsepower or more with a speed range such as 125 r.p.m. base speed to 312 r.p.m. top speed. The base speed torque would be typically valued at 378,000 foot-pounds.

In order to develop the work roll speed required for normal strip transport operation by speed stepup or stepdown as required, a gear box 24 is coupled to the output shaft of the drive motor. In turn, an output shaft 26 from the gear box 24 is coupled to a pinion stand 28 which delivers drive power simultaneously and substantially equally to the work roll spindle 16 and 18.

Drive motor arrangements other than the one just described can be employed and controlled in accordance with the principles of the invention. For example, a twin drive can be employed to produce drive power for the work roll spindles through separate drive trains. As another example, a direct drive (not shown) without intermediate gearing can be employed.

Motor operation is produced by field energization through a thyristor field power supply 30 and by armature energization through an armature thyristor power supply 32. Field and armature power is obtained from available power lines such as the three phase lines indicated by the reference characters A, B and C.

Well known solid state circuitry can be employed in the power supplies 30 and 32 to control the field and armature voltages and currents through conventional thyristor gating control techniques. In other applications of the invention, a typical motor-generator power supply or other suitable means can be employed for motor energization.

During mill operation, a speed control subsystem 34 controls the motor speed and in turn the work roll speed. The speed control 34 can be conventional analog circuitry including a speed feedback loop (not indicated), an armature current feedback loop (not indicated), and an armature voltage feedback loop (not indicated) which are cascaded together to control the thyristor firing angle in the power supply 32 and thereby control the motor armature energization. The particular form and operation of the speed control 34 will depend upon the thyristor power supply circuitry and the overall performance desired. For example, the power supply 32 can be designed to conduct current in only one direction or it can be designed to conduct current in both directions, and the speed control 34 can be adapted to provide suitable speed regulation in each of these cases.

Field energization is controlled at the same time that the armature control is in operation. Typically, the field thyristor power supply 30 would be operated to provide maximum motor field flux up to base motor speed. At higher speeds, the power supply 30 would be operated to produce lower field flux at constant armature counter electromotive force for maximum torque development.

A conventional mill speed reference bus 35 provides the basic reference voltage input to the speed control 34 and to other similar speed controls associated with other motors at the other stands in the mill. Rising voltage on the bus 35 causes the motor to accelerate the work rolls 12 up to running speed, and after a predetermined period of mill operation motor deceleration is produced by decreasing the voltage on the speed reference bus 35. If a digital computer (not shown) is included in the overall mill control system, it can be programmed to determine the speed reference in real time. With the use of digital control techniques, the computer can also be used to provide other control functions in the operation of the mill and its work rolls 12.

When it is determined that the work rolls 12 must be replaced, the mill is shut down and the motor 19 is operated in the positioning control mode to place the spindles 16 and 18 in a predetermined angular position either before or after the worn work rolls 12 are removed. In this manner, the positioning function is performed comparatively economically and efficiently because only limited additional control circuitry is required.

A mode control selector circuit 36 is formed by suitable switching and logic circuitry to select the operating mode of the motor 19 and provide certain logic functions in the controlled motor positioning operation. The mode control circuit 36 can include a selector switch (not shown) at the mill control panel which is operable preferably to effect (1) normal mill operating mode by means of an enabling signal sent to the speed control 34 as indicated by the reference character 37 and (2) a pulse positioning mode by means of enabling signals including one sent to a pulse generator control 38 as indicated by the reference character 39.

Other mode control arrangements can also be employed. For example, the speed control 34 can be normally operative and the mode control 36 can be provided with only the pulse positioning mode selection. The mode control 36 is disabled by a suitable logic signal (not indicated) until the motor 19 is stopped, and selection of the pulse positioning mode then initiates the positioning mode of operation.

Once the position mode has been effected, it is preferred that the pulse generator control 38 apply pulses to the motor armature circuit to drive the motor 19 to the predetermined position. However, a creep speed reference circuit 40 can be used to produce the positioning drive control through the speed control 34 without pulse generation. In general, however, the pulse positioning mode of operation results in greater accuracy than does the creep speed positioning mode of operation. As subsequently described more fully, it is in any event preferred that the creep speed reference circuit 40 provide motor drive for a short start-up period during the preferred pulse positioning mode of operation and prior to the initiation of pulse generation. The creep speed reference signal is terminated after start-up as positioning drive control is effected by the pulse generator control 38.

The creep speed reference circuit 40 can be formed from conventional reference circuitry. For example, it can include a preset potentiometer which produces an output reference voltage resulting in a motor operating speed of about 5 r.p.m. or less and preferably about 1 r.p.m.

A feedback control 42 detects the output spindle position and is coupled to the mode control circuit 36 in order to control the positioning operation. In this case, the output position is detected on the spindle 26 between the gear box 24 and the pinion stand 28.

Figure 2:
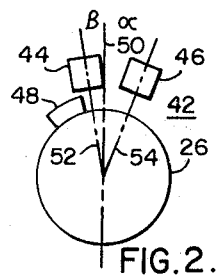
FIG. 2 shows a schematic view of a position feedback control employed in the system of FIG. 1.

As shown schematically in FIG. 2, the feedback control 42 preferably is arranged in the form of a slowdown limit switch arrangement 44 and a stop limit switch arrangement 46 which can be mounted on a rim or the like and are suitably adjustable circumferentially about the axis of the spindle 26. The switching arrangements 44 and 46 can be in the form of magnetically operated relays, and a steel slug 48 is accordingly mounted on a hub or the like on the spindle 26 for cooperative operation therewith. The slug 48 generally should have sufficient circumferential span to eliminate the effect of end play in the shaft 26.

An angle reference line 50 is preestablished, and the slowdown and stop switches 44 and 46 are angularly adjusted to predetermined angular positions as represented, for example, by reference lines 52 and 54. An angle α defines the position of the stop switch 46 which represents the stopping point of the motor 19 and the shaft 26 since the motor 19 is stopped when the slug 48 causes operation of the stop switch 46. In turn, the angle α determines by correlation the stopping position of the output spindles 16 and 18. An angle β represents the angular displacement of the slowdown switch 44 from the stop switch 46 and is predetermined by the clockwise distance through which it is desired to provide slow positioning movement. The angle β typically would be about 30°.

Other feedback elements can be employed in the feedback control 42 in place of the limit relays 44 and 46 and steel slug 48. For example, a slowdown photoelectric sender and receiver (not shown) and a stop photoelectric sender and receiver (not shown) can be employed in conjuction with a reflective surface (not shown) on the shaft 26 to provide similar position feedback functioning.

More particularly, in the preferred mode of pulse positioning operation, the mode control selector circuit 36 is set to the pulse positioning mode of operation after the motor 19 is stopped. An enabling signal is then generated as indicated by the reference character 41, and the motor 19 is operated by the creep speed reference circuit 40 through the speed control 34 at a creep speed preferably equal to about 1 r.p.m. until the slug 48 initiates operation of the slowdown switch 44. A feedback slowdown signal is accordingly sent to the mode control circuit 36 to initiate operation of the pulse control 38 as momentary motor stoppage is effected by deactivation of the creep speed reference circuit 40. However, the slowdown or momentary motor stoppage and pulse control initiation are made preferably only if the drive train has rotated sufficiently to assure that motor startup conditions have been achieved. Normally, startup conditions are met when system friction has been overcome by lubrication buildup in the various system bearings. Typically, one-half of a motor revolution would be sufficient to realize startup conditions. A time delay relay (not shown) or other suitable means can be used to prevent the slowdown signal from effecting a pulse control initiation and motor slowdown or momentary stoppage unless the shaft 26 has been turned for a time period corresponding to the predetermined startup rotational movement at the predetermined creep motor speed.

In cases where the creep speed reference circuit 40 or a similar circuit is disconnected from feedback logic control and operated as a manual control (not indicated), the motor 19 can be slowly driven by manual operation to a startup status which is suitably detected. Slowdown switch control is then made effective in a manner similar to that described for automatic operation.

In the previously indicated alternate creep speed positioning mode of operation, the pulse generator control 38 is inoperative and the creep speed reference circuit 40 is continued in an actuated state. A suitable logic circuit (not shown) in the mode control 36 is operated by the slowdown signal so as to provide for deactivating the creep speed reference circuit 40 and stopping the motor 19 when the stop switch 46 is subsequently operated.

In relation again to the pulse positioning mode of operation, the pulse generator control 38 can include a conventional solid state oscillator (not shown) which emits pulses at a predetermined rate (such as 2 per second) once the control 38 is made operative in the pulse positioning mode of operation. Preferably, the armature pulse rate is set at a value which allows at least momentary motor stoppage after the application of each armature pulse and preferably under the effects of dynamic braking.

The pulses from the generator control 38 can be applied directly to the motor armature. The field supply 30 is set to generate a suitable field flux level, and torque pulses are accordingly produced in correspondence with the armature voltage pulses to move the motor angularly until the steel slug 48 reaches the stop switch 46. At that time, a feedback signal is sent to the mode control circuit 36 and the pulse generator control 38 is turned off to stop the motor at a point which accurately positions the shaft 26, such as at a point at least within ±1° of the desired position.

Figure 3:
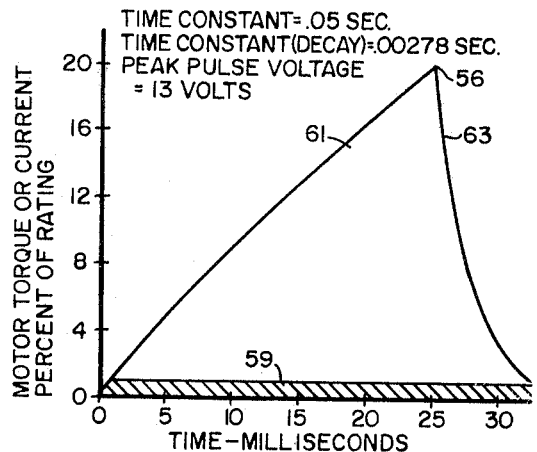
FIG. 3 shows a suitable armature current or torque pulse waveform used in providing position control operation of the system shown in FIG. 1.

Typically, the motor 19 can have an armature resistance of .005 ohm and an inductance of .00025 henrie to result in a time constant of .05 second during the acceleration time period resulting from the application of each armature voltage pulse from the pulse generator control 38. As shown in FIG. 3, motor armature current (or torque) buildup accordingly rises during the application of each positioning voltage pulse in this instance for a period of 25 milliseconds as indicated by the reference character 56. At that point in time the armature voltage pulse is terminated and armature current decays substantially to a zero value before the next voltage pulse is applied.

Armature current pulse decay occurs in accordance with the deceleration time constant as primarily determined by respective braking resistors 58 and 60. The braking resistors 58 and 60 are parallel connected in the armature circuit by means of contacts 62 and 64 which are normally closed by operation of the mode control circuit 36 during the positioning mode of motor operation. During the running mode of motor operation, the contacts 62 and 64 would be open. With a typical braking resistor value of .085 ohm, the deceleration time constant is .00278 second and in the positioning mode the armature current decay rate is made suitably fast to allow motor stoppage after each armature pulse. Each current pulse thus decays as indicated by the reference character 63 and terminates at a time point approximately 35 milliseconds after its initiation.

The shaded area 59 under the current (or torque) curve of FIG. 3 represents an estimated one percent opposing torque due to friction and the like. The friction can be more or less depending upon the particular application and, to avoid stalling, the torque produced by each armature current pulse preferably substantially exceeds the friction torque as indicated in this instance by unshaded area 61. An armature pulse voltage range, such as 10 volts to 20 volts, is predetermined in any particular application as being suitable for achieving drive needs consistently with accuracy specifications. If desired, the pulse generator control 38 can be provided with a pulse voltage amplitude adjustment for operational convenience.

Figure 4:
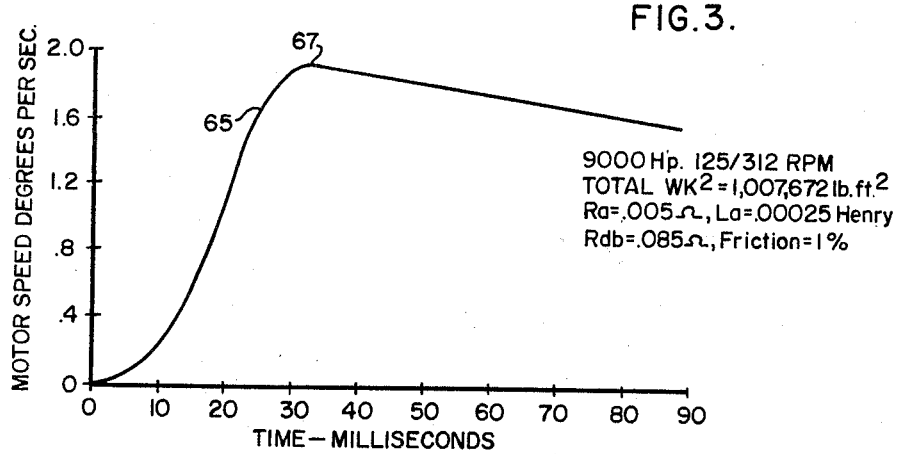
FIG. 4 shows a curve of motor speed as it operates over a pulse period of time to provide a step movement toward a preselected output position.

In FIG. 4, there is shown a curve representing the speed-time relation of the drive motor 19 when it is operated in the pulse positioning mode between the reference lines 52 and 54. With the application of each armature voltage pulse at a peak amplitude of 13 volts, the motor speed increases nonlinearly from a zero value from the time point at which the voltage pulse is first applied to the motor armature until after the voltage pulse has been removed at the 25 millisecond time point indicated by the reference character 65. Shortly before the armature current terminates at the 35 millisecond time point, the motor speed reaches a peak speed of about 1.9° per second or about ⅓ r.p.m. and then begins to decay substantially linearly as indicated by the reference character 64 until motor stoppage occurs at a time point of 331 milliseconds (not shown). At the previously indicated exemplary pulse generation rate of 2 pulses per second, there is a motor stop period of about 170 milliseconds between each pair of successive armature pulses. Average motor speed is thus very small (much less than 5 r.p.m.) during positioning over the art between the limit switch angle lines 52 and 54. However, total positioning time across the arc is short and, when the motor reaches the end of the positioning arc travel to actuate the switch 46, the pulse generator control 38 is substantially simultaneously deactuated and the motor 19 is accurately stopped at the stop position resulting from the last applied armature voltage pulse.

The approximate area under the speed-time curve of FIG. 4 represents the degrees of movement through which the motor is driven by a single armature current pulse. In this instance, the total angular motor movement produced by a single armature current pulse is approximately 0.3°. In large measure, the positioning accuracy of the system 10 is determined by the extent of angular movement produced by each successive armature current pulse. With the use of shorter pulse time or lower armature pulse voltage even greater accuracy can be achieved as compared to the accuracy associated with the pulse characteristics applicable to the curves shown in FIGS. 3 and 4. However, as previously indicated antistalling considerations limit the extent to which the pulse time and voltage magnitude characteristics can be reduced to increase the system accuracy.

In summary, the large drive motor 19 is operated in a positioning mode by a positioning control to produce accurate positioning of an output shaft with tolerances as small as ±1° or better. In the preferred pulse positioning mode of operation, the accuracy can be controlled within limits by choice of pulse characteristics. The overall arrangement provides accurate positioning economically and efficiently and is particularly useful in industrial applications such as steel mills where automatic roll changing equipment makes it desirable to have fast automatic positioning of the output from a large drive motor for roll changing purposes. Similar benefits are realized in other large industrial drive applications depending on the end purpose of output positioning under main drive control.

The foregoing description has been presented only to illustrate the principles of the invention. Accordingly, it is desired that the invention not be limited by the embodiment described, but rather that it be accorded an interpretation consistent with the scope and spirit of its broad principles.

What is claimed is:

1. A positioning control system for a large industrial DC motor drive having armature and field controls operated in normal use by a speed control associated therewith, said system comprising means for energizing the motor armature to advance the motor toward a first predetermined output angular position at a slow average and adequate rate and for an adequate angular distance to assure motor startup conditions, a pulse generator system operable to apply voltage pulses of predetermined amplitude and frequency to the motor armature circuit, means for deactivating said energizing means after motor startup conditions have been satisfied, means for activating said pulse generator system after deactivation of said energizing means and while motor startup conditions continue to be satisfied, means for sensing the output position, and means for deactivating said pulse generator system and stopping the motor substantially at the predetermined position.

2. A positioning control system as set forth in claim 1 wherein said energizing means further includes indicator means located at a predetermined angular position on a rotating output member driven by the motor, a feedback control having first limit switch means located in a predetermined and presettable angular position about the output member, said first limit switch means responsive to said indicator means and coupled to said pulse generator to actuate said pulse generator after startup and deactuation of said energizing means, and second limit switch means located in another predetermined presettable angular position about the output member, said second limit switch means responsive to said indicator means and coupled to said pulse generator to stop the motor substantially at the predetermined position.

3. A positioning control system as set forth in claim 1 wherein said pulse generator produces voltage pulses having a peak amplitude resulting in torque pulses having a peak value substantially in excess of normal torques due to friction and the like.

4. A positioning control system as set forth in claim 1 wherein said pulse generator produces voltage pulses having a predetermined peak amplitude and having an on time substantially less than the off time between successive pulses.

5. A positioning control system as set forth in claim 1, wherein means are provided for connecting dynamic braking resistance in the armature circuit during positioning control operation to increase the decay rate of each armature current pulse.

6. A positioning control system as set forth in claim 1 wherein the motor drive is employed in a metal rolling mill to drive reduction rolls, and wherein said pulse generator system is operable to apply armature voltage pulses each having a peak amplitude and frequency adapted to produce roll spindle movement through an angle less than about 1°.

7. A positioning control system as set forth in claim 1, wherein a creep speed reference circuit forms a part of said energizing means and operates the speed control to drive the motor drive at a steady creep speed of less than about 5 r.p.m.

References Cited

UNITED STATES PATENTS

| 2,827,602 | 3/1958 | Horsfall et al. | 318—28 |
| 3,068,386 | 12/1962 | Jaeger et al. | 318—28 |
| 2,467,454 | 4/1949 | Arnot | 318—20.250 |
| 2,790,280 | 4/1957 | Wilson et al. | 318—466 |
| 3,198,967 | 8/1965 | Roberts | 318—443 |

ORIS L. RADER, Primary Examiner

K. L. CROSSON, Assistant Examiner

U.S. Cl. X.R.

318—467